United States Patent [19]

Eastin

[11] Patent Number: 5,628,144
[45] Date of Patent: *May 13, 1997

[54] SOLID MATRIX PRIMING OF SEEDS WITH MICROORGANISMS AND SELECTED CHEMICAL TREATMENT

[75] Inventor: John A. Eastin, Lincoln, Nebr.

[73] Assignee: Kamterter Products, Inc., Lincoln, Nebr.

[*] Notice: The term of this patent shall not extend beyond the expiration date of Pat. No. 4,912,874.

[21] Appl. No.: 369,308

[22] Filed: Jan. 6, 1995

Related U.S. Application Data

[63] Continuation of Ser. No. 975,410, Nov. 12, 1992, abandoned, which is a continuation-in-part of Ser. No. 503,826, Apr. 3, 1990, abandoned, which is a continuation-in-part of Ser. No. 440,470, Nov. 20, 1989, abandoned, which is a continuation of Ser. No. 175,934, Mar. 30, 1988, abandoned, which is a continuation-in-part of Ser. No. 34,812, Apr. 3, 1987, Pat. No. 4,912,874.

[51] Int. Cl.$^6$ .................................................. A01G 7/00
[52] U.S. Cl. ........................... 47/58; 47/57.6; 47/DIG. 9; 47/DIG. 10; 71/13
[58] Field of Search ................ 47/57.6, 58, DIG. 9, 47/DIG. 10; 71/13

[56] References Cited

U.S. PATENT DOCUMENTS

| | | | |
|---|---|---|---|
| 3,521,402 | 7/1970 | Chaffee | 47/58 |
| 4,748,021 | 5/1988 | Chet et al. | 424/93 |
| 4,798,723 | 1/1989 | Dart et al. | 424/93 |
| 4,912,874 | 4/1990 | Eastin | 47/58 |

OTHER PUBLICATIONS

W. Heydecker et al. Social Science and Technology, vol. 5 (1977) pp. 353–425.
K. Bradford, Hort Science, vol. 21 #5, (Oct. '86) pp. 1105–1112.
J. Peterson, Scientia Horticulture, vol. 5 ('76) pp. 207–214.
H. Hartmann et al., Plant Propagation, Principles & Practices, 2nd Edition Prentice Hall Inc, Englewood Cliffs, NJ ('68) pp. 27–31.
G. Harman et al., Phytopathology, 78 (5) (88) 530–525.
A. Taylor et al., Scient Hort., vol. 37 ('88) 1–11.

*Primary Examiner*—Charles C. P. Rories
*Attorney, Agent, or Firm*—Vincent L. Carney

[57] ABSTRACT

In the process of the invention, the seed to be treated, a predetermined amount of solid matrix material and a predetermined amount of water are admixed and the mixture allowed to stand, preferably in a container which allows entry of air but which reduces evaporative losses, for example, a closed container with a small top opening, for a time and at a temperature sufficient to allow the seeds to imbibe water from the matrix and come to a water content equilibrium sufficient to enhance resultant plant vigor, i.e., enhance emergence, growth or yield characteristics, but short of that which would cause the seed to sprout. The seeds and matrix may be inoculated with beneficial microorganisms during priming. Moreover, inoculate seeds and matrix may be used to inoculate soil.

25 Claims, No Drawings

SOLID MATRIX PRIMING OF SEEDS WITH MICROORGANISMS AND SELECTED CHEMICAL TREATMENT

RELATED CASES

This application is a continuation of application Ser. No. 07/975,410, filed Nov. 12, 1992 now abandoned, which is a continuation-in-part of application Ser. No. 07/503,826 filed Apr. 3, 1990, now abandoned, which is a continuation-in-part of application Ser. No. 07/440,470, filed Nov. 20, 1989, now abandoned, which is a continuation of application Ser. No. 07/175,934 filed Mar. 30, 1988, now abandoned, which is a continuation-in-part of U.S. patent application Ser. No. 034,812 filed Apr. 3, 1987, entitled SOLID MATRIX PRIMING OF SEEDS issued as U.S. Pat. No. 4,912,874.

BACKGROUND OF THE INVENTION

This invention relates to the conditioning of seeds, such as for example, by priming, chemical treatment and biological treatment and to the use of biologically treated seeds to recondition land and improve plant productivity.

Seed priming or osmoconditioning are terms to describe a known pre-sowing hydration treatment developed to improve seedling establishment (Heydecker and Coolbear, 1977, *Seed Science and Technology* 5:353–425), (Khan, et al., 1980/81, *Israel J. Bot.* 29:133–144) and (Bradford, 1986 *HortScience* 21:1105–1112).

In seed priming, the seeds are placed in an aerated osmotic media of known water potential. In this process, the osmotic solutions induce a water potential that prevents the completion of germination (radicle emergence). Seeds are, however, able to imbibe and complete the early phases of germination under limiting water content conditions. The duration of the priming treatment has been reported to be from less than 24 hours (Guedes and Cantliffe, 1980, *J. Amer. Soc. Hort. Sci.* 105:777–781) to several weeks (Khan, et al., 1980/81, supra) and is dependent on species, cultivar and even seedlot. Seeds are then dried back. After priming, seeds can be sown with existing planters. Results obtained from priming different crop seeds have been reviewed by Bradford, 1986, supra. In general, seedling emergence of primed seeds is earlier and more sychronous than dry sown seeds. Improvements in plant growth and yield characteristics have also been documented.

In the prior art priming processes, several different osmoticums have been used to achieve the water potential for priming including high molecular weight (MW of 6000–8000) polyethylene glycol (PEG) and/or inorganic salts (Heydecker and Coolbear, 1977, supra). After priming, the seeds are removed from the solution used for establishing the water potential before being dried back.

Several technical and logistical difficulties have been encountered with the prior art priming techniques. For example, osmotic solutions require continuous aeration and in general, a large volume of priming solution is required per quantity of seeds. Reductions in percentage seedling emergence have been reported with the use of inorganic salts (Brocklehurst and Dearman, 1984, *Ann. Applied Biol.* 102:585–593). A relatively high concentration of PEG in solution is viscous and has low oxygen solubility and diffusivity (Mexal, et al., 1975, *Plant Physiol.* 55:20–24).

An alternative to the use of solutions is to prime seeds in a solid medium. A solid material should have a high water holding capacity and allow seeds to imbibe. Peterson (1976, *Sci. Hort.* 5: 207–214) described a procedure to prime onion seeds in a slurry of PEG 6000 and vermiculite. A ratio of three to four parts vermiculite moistened with PEG solution were mixed with one part seed. Although this technique overcame the need for aeration, he reported that the seeds were difficult to separate from the vermiculite. Methods have been described to increase the seed moisture content of large-seeded vegetables prior to sowing (Bennett and Waters, 1984, *J. Amer. Soc. Hort. Sci.* 109:623–626 and 1987, *J. Amer. Soc. Hort. Sci.*, 112:45–49). Seed moisture content of lima beans (*Phaseolus lunatus*) and sweet corn (*Zea Mays*) was increased by combining seed, vermiculite and a known amount of water in a closed container. This mixture was incubated and then the vermiculite sieved away prior to sowing the hydrated seed. Seedling establishment was improved by the pre-sowing treatments for both crops.

Inoculation of seeds with bacteria or chemicals prior to planting is known in the art. For example, United Kingdom patent specification 849,210 discloses inoculating seeds under reduced pressure to enable penetration of the bacteria under the coat of the seed and thus survival of the bacteria for a period of time. This procedure is expensive and appears to be limited in the range of bacteria that can be inoculated into seeds.

SUMMARY OF THE INVENTION

Accordingly, it is an object of the invention to provide a novel technique for priming seeds.

It is a still further object of the invention to provide a novel technique for inoculating seeds.

It is a still further object of the invention to provide a novel technique for inoculating soil.

It is a still further object of the invention to provide a novel technique for inoculating soil for bioremedial purposes.

In accordance with the above and further objects of the invention, a solid phase media is used to prime seeds. The solid matrix provides a structure to hold water and allow gas exchange. Chemical treatment and addition of microorganisms may be accomplished during priming. The seeds may be used to inoculate soil with bacteria such as for example, bacteria useful in agriculture or to breakdown contaminants in the soil and facilitate plant uptake of contaminants from soils, such as for example, radionuclides.

DETAILED DESCRIPTION OF THE INVENTION

To prime seeds, the seeds are incorporated in a solid phase matrix comprising finely divided nonpathogenic, water-holding solids. Preferably, the matrix material, not including the seeds, is in such proportion and distribution with respect to the seeds so that the seed surfaces are sufficiently aerobic to favor aerobic metabolism of the seeds and of beneficial microorganisms, to deter the growth of unfavorable facultative anaerobes or anaerobic microorganisms and to permit proper metabolic changes. In most cases, this is accomplished by using the proper volumetric ratio of seed to matrix material and aeration.

The volumetric ratio of seed to matrix material should be for practical reasons in the range of one volume of seed to 120 of matrix material at one extreme to one of matrix to ten of seed at the other extreme. Preferably, a one to one ratio of seed to matrix is generlly favorable but the ratio may be lower as in cases where seed exudation and germination inhibitor removal are significant seed priming and treatment objectives and higher such as when microbial inoculation calls for retaining exudates. In cases where the seed to matrix mixture contains a substantially larger volumetric ratio of seed over matrix, proper aeration during priming can be maintained through a combination of mechanical mixing and aeration of the seed plus matrix mass or more aeration.

The matrix material, when containing the water necessary to prime the seeds in question, should be sufficiently friable, nonclumping etc. so that, when desired, it can be separated from the treated seeds after treatment without damage to the seeds. The particle size of the matrix material is not unduly critical as long as surface area is adequate, but for mechanical reasons should be smaller or larger than the seed being treated, usually less than 20 mesh and preferably substantially different. Typically, a material less than about 60 mesh is preferred; for example the Agro-Lig described hereinafter was 90% /wt less than 200 mesh, the soft coal was less than 60 mesh.

One type of matrix is formed of organic solids, for example a carbonaceous, preferably a lignateous solid which has a large equilibrium water potential and preferably has an osmotic potential component which is at least about 90% and preferably greater than 95% of the total water potential, measured as described below. Examples of such material include coal, especially soft coal, lignateous shales such as the leonardite shale, sold as Agro-Lig, and sphagnum moss.

Another type of matrix material is inorganic such as calcined clay mineral, vermiculite and perlite. To achieve a practical cost-effective system using an inorganic particulate matter as the matrix, the bulk density of a matrix of that inorganic particulate matter is preferably above 0.3 grams per cubic centimeter. In this specification, bulk density means the weight in grams of a given volume of particulate material divided by its volumes in cubic centimeters. When using inorganic materials, the water potential is generally determined not primarily by osmotic potential but primarily by matric potential.

In the process of the invention, the seed to be treated, a predetermined amount of solid matrix material and a predetermined amount of water are admixed and the mixture allowed to equilibrate, preferably in a container designed to provide aeration but which reduces evaporative losses, for example, a closed metal container or bag, for a time and at a temperature sufficient to allow the seeds to imbibe water from the matrix and maintain or change a prescribed water content equilibrium temperature and aeration sufficient to enhance resultant plant vigor, i.e., enhance emergence, growth or yield characteristics, but short of that which would cause the seed to sprout. Particularly useful materials for the matrix are coal related materials, calcined clay, diatomaceous earth vermiculite, sawdust, perlite, peat/moss, corn cobs and grain dust.

As in solution priming, the equilibrium amount of water for the system to prime the seed is dependent on the specific seed variety, its state or condition, and the water potential of the solid matrix material. Typically the solid matrix material should have a water potential between about −0.5 to about −0.2 megapascals at equilibrium with the seeds. With control of temperature, this range may be extended to −0.2 to about −3.6. The exact conditions depend on the objectives and species such as destruction of inhibitors or physiological or physical blockages. The seed priming art to some extent is still empirical, and while typical water amounts and media water potentials for given seed types are already generally known from the solution priming art and solid state matrix priming experiments for some seeds, it is frequently best to test a small sample of a new seed over a readily determined range of water potentials and temperatures to determine what conditions of temperature, water potential and time cause appropriate imbibing of water by the seed and resultant pregermination events. After this priming, the seeds may be dried to a resting or dry storage state, with or without the matrix material. Treatment with beneficial microbes or chemical treatment may be before, during or after priming.

In one process of the invention, a known weight of seed is wet with about 25% by weight of water. The total water utilized is typically in the order of about one liter per kilogram of seed but varies with seed size and seed condition. The seed is mixed with the dry, flowable, particulate solid matrix material and water with appropriate chemicals or biologicals added so as to wet seeds and particulate matrix material uniformly. After the predetermined amount of water for priming is admixed with the coated seeds, the mixture is held at a predetermined temperature for a time sufficient to allow the seeds to maintain a desired moisture content equilibrium, usually one to about fourteen days. In other processes, the water, seed and matrix material are mixed in a continuous flow or batching blending system. The ratio of water may also vary substantially from 25 percent of the seed weight.

The seeds that can be treated can be virtually any seed, including most vegetable crops, ornamentals and agronomic crops. Included are cucumber, lettuce, carrot, onion, melons, sweet corn, tomatoes, eggplant, peppers, bean radish, squash, pea, flower seeds, alfalfa and soybean.

The solid matrix priming compositions described above can also advantageously contain: (1) prescribed amounts of known seed fungicides such as thiram, captan, metalaxyl, pentachloronitrobenzene, and fenaminosulf, so that the finished primed seed is coated with or absorbs the desired amount of fungicide, such as is known to those skilled in the art; (2) microorganisms useful to the crop such as those useful in crop protection, stimulation or establishment, and for such purposes, some significant bacteria are strains of: *Bacillus enterobacter*, Pseudomonas, Rhizobia and Serratia species and some significant fungi are strains of Trichoderma, Gliocladium and Laetisaria species; (3) pesticides such as fungicides or bactericides included prior to, during or after the solid matrix priming; and (4) growth regulators such as potassium nitrate, gibberellic acid, DCPTA, ethephon.

In this specification, "solid matrix priming" is considered the process whereby seeds are intimately mixed with particulate solid phase media in the presence of sufficient water to realize a moisture content in the seed which allows for germination processes to occur but which prevents radicle emergence. During priming and especially during solid state priming, the addition of chemical additives and microorganisms is especially beneficial. In this specification, the language "added beneficial microorganisms" means a beneficial microorganism that is added to the composition at a level in excess of that naturally occurring on the seed being primed.

In this specification: (1) threshold germination temperature range means that range of temperatures for a certain species within which seeds of that species will germinate at a predetermined moisture level and with adequate oxygen; and (2) threshold germination moisture range means that range of moistures for a certain species within which seeds of the species will germinate at a given temperature and with adequate oxygen.

In addition to the above ranges, the limiting points of moisture and temperature in this specification are defined as follows: (1) threshold germination temperature base means that temperature below which a seed for a given species will not germinate even though the oxygen and moisture levels are acceptable; (2) threshold germination critical maximum temperature means that temperature above which a seed of a given species will not germinate even though there is an acceptable moisture level and adequate oxygen; (3) threshold germination moisture base means that moisture level below which a seed of a given species will not germinate even though the temperature and oxygen are appropriate; and (4) threshold germination moisture critical maximum level means that moisture level in soil above which a seed of a given species will not germinate even though the temperature and oxygen are adequate.

Other convenient terms are defined as follows: (1) emergence rate index means the sum of the emerged seeds, n, on each day multiplied by a quantity for that day, quantity for that day being equal to the total number, c, of days in the assay minus the count, n, of seedlings on that day; and (2) synchronization factor means the emergence rate index that occurs in the period that is one-quarter of the time into the total assay period. The assay period is a normal field crop emergence period. The emergence rate index and synchronization factor can be calculated using seeds germinated instead of seedlings emerged to arrive at a similar number. This may be called a germination rate index.

The above values are determined empirically for a given seed and variety and may be used in planting.

A sufficient amount of matrix or a matrix of material sufficiently adsorbent or absorbent to remove enough inhibitors to prevent delay of more than fifteen percent of the time duration of activation prior to a control time of germination in which the inhibitor is substantially completely removed by an appropriate washing technique is required. The time of germination in this specification is that the visible radicle protrusion can be observed and the activation period occurs when membranes become differentially permeable and conversion occurs from substantially passive solute transport in and from the seed. The amount and type of matrix is also selected to either retain or permanently remove exudates so that: (1) in the case of removal, it is not deleterious such as for example, to encourage pathogen growth; or (2) in the case of retention, to enable growth of innoculated beneficial microbes on seeds.

EXAMPLE

Seed-Solid Matrix—Water

Preliminary studies were conducted to determine the ratio of seed to solid matrix to water for effective solid matrix priming (SMP). The goal was to achieve a seed moisture content that would allow favorable pregermination activity and prevent radicle emergence for a particular crop. This optimal ratio was determined on an empirical basis by mixing seed and solid matrix on a weight to weight basis. The water was calculated as a percentage of the seed and solid matrix by weight. The seed, solid matrix and water were mixed and incubated at 15 degrees Celsius in a closed container with a small hole in the lid for ventilation. Results are shown for different crops in Table 1. Table 1. The optimal ratio of seed-solid matrix for effective priming of different vegetable at 15 degrees Celcius.

TABLE 1

The optimal ratio of seed-solid matrix for effective priming of different vegetable at 15 degrees Celcius.
PARTS BY WEIGHT

| Crop | Duration (day) | Matrix | Seed | Solid %(z) Matrix | Water |
| --- | --- | --- | --- | --- | --- |
| Tomato | | Agro-Lig(1) | 1.0 | 1.5 | 95 | 6 |
| | | Soft coal(2) | 1.0 | 1.5 | 95 | 6 |
| | | Sphagnum moss | 1.0 | 1.5 | 90 | 6 |
| Carrot | | Agro-Lig | 1.0 | 1.5 | 90 | 6 |
| Onion | | Agro-Lig | 1.0 | 2.0 | 80 | 6 |
| Lettuce | | Agro-Lig | 1.0 | 2.0 | 85 | 1 |
| Cucumber | | Agro-Lig | 1.0 | 1.5 | 60 | 6 |

(z) Percentage water based on dry weight of solid matrix
(1) Total % organic 84%, less than 1% nitrogen
(2) Total % organic 90%, less than 1% nitrogen Moisture contents and water relations of humates and seeds Seeds of the five crops were primed in Agro-Lig as described in Table 1. Seeds were separated from the Agro-Lig by shaking through appropriate sized sieves. At the end of the priming treatment, the percent moisture content of the seeds in Agro-Lig was determined gravimetrically. The matrix potential (psi-m) of Agro-Lig was determined as described by Black (ed), 1965, "Methods of Soil Analysis" Academic Press, NY, N.Y. The osmotic potential (psi-s) of the Agro-Lig was determined by the following procedure. Four parts distilled water was added to one part Agro-Lig (wt/wt), samples from each crop to produce an extract (Greweling and Peech, 1960, N.Y. Agri. Expt. Station Bul. 960).

The liquid phase was filtered and the psi-s of the Agro-Lig solution extract was determined with a Microsmettte model 5004 (Precision Systems Inc., Natick, Ma.). The psi-s of Agro-Lig without seeds was also calculated to quantify the influence of seed leakage on the psi-s of the medium. The total water potential of the Agro-Lig was determined for each crop after SMP with a HR-33 dewpoint microvolt meter and C-52 sample chamber (Wescor Inc., Logan, Utah). Thus the total water potential calculated from its component fractions, psi-m and psi-s could be compared with the water potential measured by thermocouple psychrometry. There were four replications per treatment for each study.

Seedling emergence studies

The influence of solid matrix priming (SMP) and other conventional seed priming treatments was studied on seedling emergence and plant growth in growth chamber studies. SMP of tomato (*Lycopersicon esculentum*) 'New Yorker' was conducted with Agro-Lig, soft coal and sphagnum moss (Table 1). Other priming treatments included: −1.0 MPa PEG 8000 (Coolbear, et al., 1980, *Seed Sci. and Technology* 8:289–303) and 1.0% $KNO_3$ and 1.5% $K_3PO_4$ (Ells, 1963, *proc. Amer. Soc. Fort. Sci.* 83:684–687). SMP of carrot (*Daucus carota*) 'Danvers 126' was conducted with Agro-Lig (Table 1). Other priming treatments included: 25% PEG 8000 (Szafirowska, et al., 1981, *Agron. J.* 73:845–848) and 0.2 m $KNO_3$ +0.1 m $K_3PO_4$ (Haigh, et al., 1986, *J. Amer. Soc. Hort. Sci.* 111:660–665). SMP of onion (*Allium cepa*) 'Downing Yellow Globe' was performed with Agro-Lig (Table 1). Other priming treatments included: 34.2% PEG 8000 (Brocklehurst and Dearman, 1983, Supra) and 0.2 m $KNO_3$+0.1 m $K_3PO_4$ (Haigh, et al., 1986 (supra).

All priming treatments were performed at 15 C. for 6 days which, in many cases, is a modification of the original procedure described in the literature. All priming treatments were prepared with 0.2% (wt/v) thiram (Gustafson, Inc., Dallas, Tex.) as a fungicide.

Seeds were rinsed and blotted dry after priming. Seeds were sown in flats filled with an artificial (Peat-vermiculite) soil media. There were four replications of 50 seeds per rep in a randomized complete block design. Flats were maintained in growth chambers with 20 C. day and 10 C. night with a 12 hour photoperiod. Seedling emergence was recorded daily and the plant dray weight was determined at the termination of the emergence period.

Thermodormancy

Alleviation of thermodormancy by priming was studied in lettuce (*Lactuca sativa*) 'Montello'. SMP of lettuce was performed with Agro-Lig (Table 1). Conventional priming treatments included: −1.5 MPa PEG 8000 (Bradford, 1986, supra) and 1.0% $K_3PO_4$ (Cantliffe, et al., 1984, *plant physiol*. 75:290–294). After priming, seeds were rinsed and allowed to dry. Seeds were placed to germinate on moistened blotters in closed containers. The containers were maintained at a constant 35 C. in the dark. There were four replications of 50 seeds each and the percent germination was determined after 10 days.

SUMMARY

Seed-Solid Matrix—Water

The solid matrix served as a reservoir for water and 1.5 to 2.0 parts of solid matrix were required per part of seed to allow effective priming (Table 1). The percentage of water added varied with crop and ranged from 60 to 95%. Despite the high initial water content of the mixture, the solid matrix remained friable and did not lose its structure.

Moisture contents and water relations

Seeds of all crops were able to imbibe water from the Agro-Lig since a reduction in the Agro-Lig moisture content was measured after SMP (Table 1 and 2). At equilibrium all crops except for cucumber had a higher percentage moisture content than the Agro-Lig (Table 2). The treshold seed moisture content for priming varied with crop and ranged from 42 to 24 percent (wet basis).

The components of the total water potential responsible for priming were determined. The water potential of Agro-Lig is the sum of the psi-s and psi-m. The water potential of the medium varied with crop and ranged from −1.34 MPa for SMP tomato to −1.77 MPa for SMP cucumber. The psi-m contributed only a small fraction of the total water potential and ranged from 3 kPa for SMP tomato to 23 kPa for SMP cucumber. The psi-s due to the Agro-Lig alone was responsible for the largest portion of the water potential, however, additional osmotic effects was attributed to solute leakage from seeds into the medium. Calculation of the Agro-Lig water potention by its component parts overestimated (predicted a lower water potential than) the Agro-Lig, except in the case of the cucumber, as determined by thermoocouple pychrometry (Table 2).

Seedling emergence studies

Sowing tomato seeds from all priming treatments decreased the time to 50% seedling emergence (T50) and increased the plant dry weight compared to the non-primed control (Table 3). SMP with Agro-Lig and priming with PEG resulted in greater percent emergence, however, the PEG treatment had a higher T50 and less dry weight per plant compared to other priming treatments. From this study and other experiments (data not shown), Agro-Lig was chosen for the solid medium for the bulk of the studies.

Priming carrot seeds with inorganic salts resulted in lower percentage seedling emergence (Table 4). Faster seedling emergence (lower T50) was obtained form sowing SMP seeds with Agro-Lig. Sowing onion seeds after SMP with Agro-Lig decreased the T50 and increased the plant dry weight compared to all other treatments (Table 5).

Thermodormancy

The beneficial effects of SMP has already been shown by sowing crops into a cool soil environment. Short term priming treatments were also studied to alleviate thermodormancy in lettuce. Imbibing non-primed seeds at 35 C. resulted in 1% germination (Table 6). Conventional priming treatments and SMP with Agro-Lig were able to alleviate thermodormancy.

The attainment of a threshold seed water content is most important for seed priming (Table

TABLE 2

The percent moisture content of Agro-Lig and seeds after SMP. The total water potential of the Agro-Lig was determined by thermocouple pychrometry.
PERCENT MOISTURE CONTENT

| Crop | Agro-Lig (dry basis) | Seed (dry basis) | Seed (wet basis) | Psi MPa |
|---|---|---|---|---|
| Tomato | 50 | 61 | 38 | −1.1 |
| Carrot | 42 | 67 | 40 | −1.2 |
| Onion | 38 | 73 | 42 | −1.4 |
| Lettuce | 42 | 72 | 42 | −1.4 |
| Cucumber | 35 | 32 | 24 | −1.9 |

TABLE 3

The influence of seed priming treatments on tomato seedling emergence and growth.

| Treatment | Emergence % | T50 (days) | Dry wt. per plant (mg) |
|---|---|---|---|
| Nontreated | 87 b | 13.0 a | 4.25 c |
| Agro-Lig | 98 a | 9.1 c | 8.36 a |
| Soft coal | 95 ab | 9.6 c | 8.23 a |
| Sphagnum moss | 95 ab | 9.4 c | 8.02 a |
| −0.1 0MPa PEG | 98 a | 10.5 b | 7.02 b |
| 1.0% $KNO_3$ and 1.5% $K_3PO_4$ | 95 ab | 9.1 c | 8.16 a |

LSD (5%)

TABLE 4

The influence of seed priming treatments of carrot seedling emergence and growth.

| Treatment | Emergence % | T50 (days) | Dry wt. per plant (mg) |
|---|---|---|---|
| Nontreated | 88 a | 10.8 a | 1.38 c |
| Agro-Lig | 89 a | 7.7 c | 2.17 a |
| 25% PEG | 87 a | 8.5 b | 1.89 b |

TABLE 4-continued

The influence of seed priming treatments of carrot seedling emergence and growth.

| Treatment | Emergence % | T50 (days) | Dry wt. per plant (mg) |
|---|---|---|---|
| 0.2 m KNO₃ + 0.1 m K₃PO₄ | 73 b | 8.1 b | 2.02 ab |

LSD (5%)

TABLE 5

The influence of seed priming treatments on onion seedling emergence and growth.

| Treatment | Emergence % | T50 (days) | Dry wt. per plant (mg) |
|---|---|---|---|
| Nontreated | 99 a | 11.0 a | 2.16 c |
| Agro-Lig | 98 ab | 6.0 c | 3.61 a |
| 34.2% PEG | 98 ab | 8.2 b | 2.93 b |
| 0.2 m KNO₃ + 0.1 m K₃PO₄ | 95 b | 7.8 b | 2.87 b |

LSD (5%)

TABLE 6

The influence of seed priming treatments on lettuce germination at 35 C.

| Treatment | Treatment duration hours | Percent germination |
|---|---|---|
| Nontreated | — | 1 b |
| Agro-Lig | 24 | 75 a |
| −1.5 MPa PEG | 24 | 71 a |
| 1.0% K₃PO₄ | 20 | 71 a |

LSD (5%)

2). The water potential of the medium is indirectly related to the seed moisture content (r=0.75). Bradford (1986, supra) primed lettuce seeds for 24 hours in −1.5 MPa PEG. The seed moisture content was ca 70% which is in close agreement with our data (Table 2). Similar data has been reported for carrot; seeds were incubated in −0.1 and −1.5 MPa PEG solution for 6 days which resulted in seed moisture contents of 76 and 68% respectively (Hegarty, 1977, *New Phytol.* 78: 349–359).

Results from the water potential components of Agro-Lig are very interesting. One would immediately expect that the major component responsible for water potential was psi-m which is attributed to the fact that Agro-Lig is similar to an organic soil. However, psi-m could account for less than 1.5% of the total. The major portion of water potential is psi-s which is attributed to the Agro-Lig composition. Analysis of the Agro-Lig has revealed the presence of $10.2 \times 10^3$, $1.84 \times 10^3$ and $1.187 \times 10^3$ ug of calcium, magnesium and sodium, respectively per g of material.

Solute leakage from all sedd kinds were found to contribute to the psi-s. In a separate study, tomato seeds were leached for 6 hours and then dried back to the original moisture content. SMP of these previously soaked seeds resulted in radical emergence. Thus, the osmotic effect of solute leakage from seeds during SMP does contribute to the water potential of the medium.

Determination of the optimal ratio of seedsolid matrixwater was performed on a empirical basis. It must be understood in this system that, unlike priming with solutions, there is not a large portion of solid matrix to seed. Thus as seeds imbibe and leak solutes the water potential of the medium changes. A simple screening procedure is used to obtain the optimal ratio of matrix, water and additives for a particular seedlot. There are several factors that influence this ratio. Seed characteristics include: threshold seed moisture content, affinity for water and the solute leakage. Agro-Lig characteristics include: innate chemical composition which influence the psi-s, the water holding capacity and water retention characteristics.

Seedling emergence and germination tests were conducted to evaluate the promotive effects of the pre-sowing treatments. Conventional priming treatments with PEG in inorganic salts were selected from the literature. Treatment comparisons with liquid priming treatments could better test the effectiveness of SMP. SMP with Agro-Lig was statistically equal to or better than conventional priming treatments for improving seedling emergence, decreasing T50 and increasing plant dry weight (Table 3, 4 and 5). Thermodormancy was shown to be alleviated with either SMP or liquid priming treatments (Table 6).

It is not fully understood why SMP is superior to conventional liquid priming treatments, however it is believed to be due to: (1) better aeration; (2) less phytotoxicity; and (3) the availability of growth promoting substances in the Agro-Lig. Humic acid is a naturally occurring plant growth regulator extracted from Agro-Lig (american Colloid Co.). Humic acid has been shown to stimulate seed germination and seedling growth in carrot (Ricotta and Sanders, *J. Am. Soc. Hort. Sci.* in press). Seedling root and shoot growth has been promoted with humic acid in wheat (*Triticum aestivum*) (Malic and Azam, 1985, *Environ. and Exp. Bot.* 25:245–252).

Similarly, it is not fully understood why synergistic results are achieved from the use of added microbes and chemicals during priming but such results are shown by tests, the results of which are provided in Tables 7 and 8.

The data in Table 7 demonstrate synergism with regard to solid matrix priming and the utility of the technique in eliciting beneficial stand establishment effects when used with beneficial microorganisms in addition to the effect of either treatment alone. Other tests show that the systemic when added to the solid matrix priming system as well.

The data in Table 8 demonstrate that beneficial microorganisms act synergistically with solid matrix priming in conferring stand establishment benefits. Seedling carried further show superior resistance to damping off when treated with 1-102 in the solid matrix priming system. The differential of 30 to 40% increase in emergence due to treatment during priming has been found to be consistent. Similar data with beneficial pseudomonas, corynebacteria, enterobacter and bacillus species over a range of crops have been obtained.

The inoculation of seeds during matrix priming may be used as an inoculation system to introduce beneficial microbes into soil by inoculating seeds

TABLE 7

Effect of *Serratia proteamaculans* Strain 1–102,
solid matrix priming and chemical seed treatment on Canola
seedling emergence in Pythium infested soil.
Days After Planting % Emergence

| Treatment | 1 | 2 | 3 | 4 | 5 | 6 | 7 |
|---|---|---|---|---|---|---|---|
| Untreated | 0 | 0 | 0 | 4 | 17 | 18 | 20 |
| SMP | 0 | 0 | 0 | 3 | 10 | 13 | 15 |
| Vitavax | 0 | 0 | 0 | 10 | 42 | 58 | 64 |
| 1–102 | 0 | 0 | 0 | 8 | 38 | 52 | 60 |
| SMP + 1–102 AP | 0 | 0 | 0 | 21 | 50 | 62 | 67 |
| SMP + 1–102 DP | 0 | 0 | 0 | 26 | 63 | 82 | 82 |

SMP = solid matrix priming in calcined clay and pH 6.8 phosphate buffer.
SMP + 1–102 AP = strain 1–102 added to the seeds after SMP.
SMP + 1–102 DP = strain 1–102 added during priming which was for a 3 day period.

TABLE 8

Effect of *Serratia Proteamaculans* Strain
1–102, solid matrix priming and biological seed
treatment on Cucumber seedling emergence in Pythium
infested soil.
Days After Planting % Emergence

| Treatment | 1 | 2 | 3 | 4 | 5 | 6 | 7 |
|---|---|---|---|---|---|---|---|
| Untreated | 0 | 0 | 0 | 0 | 0 | 0 | |
| SMP | 0 | 1 | 10 | 20 | 23 | 22 | |
| 1–102 | 0 | 0 | 1 | 2 | 8 | a | |
| SMP + 1–102 AP | 0 | 3 | 15 | 50 | 48 | 43 | |
| SMP + 1–102 DP | 2 | 8 | 58 | 79 | 80 | 80 | |

SMP = Solid matrix priming in calcined clay and pH 6.8 phosphate buffer.
SMP + 1–102 AP = strain 1–102 added to the seeds after SMP
SMP + 1–102 DP = strain 1–102 added during priming with beneficial microbes and permitting them to grow. In this specification, the words "beneficial microorganisms" or "beneficial microbes" means microorganisms inoculated by seeds and which are any of those many microbes that: (1) have been identified in association with plant roots, soils and seeds and/or as endophytes and determined to result in growth substance mediated plant growth promotion, improved plant nutrition and pest control through biocontrol and/or improved plant health to have potential utility in agriculture; (2) have been identified or can be further selected or engineered from those already identified to degrade specific chemical agents in soils to have potential utility in environment bioremediation if effectively delivered to the target site; and (3) are believed to be useful in supporting and protecting somatic embryos (synthetic seeds) as a substitute for zygotic seeds to deliver genetic characteristics of species which cannot be handled as zygotic seeds or to propagate elite germplasm and hybrids that are not now possible. The use of somatic embryos is described in Cantliffe D. J., Liu J. R. (1987), "Development of artificial seed of Sweet potato for clonal propagation through somatic embryogenesis in: Methane from biomass: A systems approach", Smith W. H., Frank J. R. (eds) Elsevier, N.Y., pp 183–195.

Beneficial microbes in association with plants are ubiquitous in natural soil environments and serve useful functions in removing contaminants from the ecosystems. Such beneficial microbes are described in John Davison, "Plant Beneficial Bacteria", Bio/Technology, pages 282–284 and Chet, et al., "Mechanisms of biocontrol of soil-borne plant pathogens by Rhizobacterial", D. L. Keister and P. B. Cregan (Eds.), The rhizosphere and plant growth, 229–236. However, with the exception of Rhizobium and Bradyrhizobium genera, none of the many beneficial rhizosphere, soil or seed based microbes that have been identified has been extensively commercialized. The problem is not whether useful microbes can be identified but the economic delivery of a reproducibly useful inoculum at the target site.

The potential utility of beneficial microbes in managed terrestrial ecosystems for agriculture and environment bioremediation is substantially dependent on delivering adequate numbers of targeted beneficial microbes to the ecosystem site/niche where activity is needed at an economical cost.

However, it has been discovered that seed inoculation and the subsequent growth of the target microbe in the root environment provides an economical mechanism for delivering adequate numbers of beneficial microbes to a terrestrial environment. The bulk of the inoculum increase takes place using photosynthesis as energy and the rhizoplane, rhizosphere or plant endosphere as the bioreactor site.

Numerous genera of plant growth promoting rhizobacteria (PGPR) have been reported to have growth promotion and biocontrol activity (Schroth and Hancock, 1981). Their review was over a decade ago and many other reports have been made since that time. However, PGPR usually fail in the field because of poor bacteria distribution on roots and failure of their antagonistic activity toward detrimental rhizosphere microbes (Schippers, et. al., 1987). It is generally believed that a critical threshold population of a particular PGPR must be established to be effective and the method of application is critical (Weller, 1988). The solid matrix seed priming (SMP) process and a solid matrix seed priming based microbial inoculation process (SMPI) which has been effective in

TABLE 10

Effect of Allelix's *Serratia
proteamaculans* strain 1–102 and solid matrix priming
on percentage cucumber seedling emergence in
Pythium-infested soil.
Days after planting

| Treatment | 1 | 2 | 3 | 4 | 5 | 6 |
|---|---|---|---|---|---|---|
| Untreated | 0 | 0 | 0 | 0 | 0 | 0 |
| SMP | 0 | 1 | 10 | 20 | 23 | 22 |
| 1–102 | 0 | 0 | 1 | 2 | 8 | 8 |
| SMP + 1–102 AP | 0 | 3 | 15 | 50 | 48 | 43 |
| SMP + 1–102 DP | 2 | 8 | 58 | 79 | 80 | 80 |

SMP = solid matrix priming in SMP media no. 2 and pH 6.8 phosphate buffer.
SMP + 1–102 AP = strain 1–102 added to the seeds after SMP.
SMP + 1–102 DP = strain 1–102 added during priming.

establishing large PGPR numbers on seeds and has resulted in effective seedling establishment in disease stress situations as shown in Table 10 (Table 1, Eastin, 1987, Solid matrix priming of seeds with microorganisms and selected chemical treatment, U.S. patent application Ser. No. 07/440, 470; Eastin and Harman, 1987, Biological control and solid matrix priming, U.S. patent application Ser. No. 034,813). The data in table 10 are representative of results with *Pseudomonas flourescens*, *Pseudomonas putida*, *Enterobacter cloacae* and *Trichoderma* strains that have been tested. It can be understood from this table that there is a large differential achieved if bacteria are applied during priming as contrasted to after priming. It is believed the superior emergence response from SMPI under disease pressure as shown in Table 10 is a function of bacterial colonization of the seeds as contrasted to the lesser response with equivalent numbers of the same bacteria applied topically.

The SMPI system is based on the concept that microbes function in nature as colonies and the SMPI process provides microorganisms the opportunity to grow and colonize on hydrated seed surfaces. Priming seeds and the process of growing microbes on seeds during priming synchronizes radicle emergence and seedling development better with microbial activity from colonies established on the seed. The large log increase in bacteria numbers in/on the seeds appears to mean that low inoculum levels can result in large seed bacteria population if the proper inoculation system is used. This has large economic implications as inoculum can be increased by growing on the seed per se.

To inoculate soil with a beneficial microbe of any of the types described above, seeds are primed by mixing with the seeds a particulate solid matrix material and a seed priming amount of water, for a time and at a temperature sufficient to cause the seeds to imbibe sufficient water to enhance resultant plant vigor but insufficient to cause seed sprouting wherein said mixture has a water potential between about −0.5 to about −2.0 megapascals at equilibrium with said seeds and said particulate solid matrix material is nonpathogenic to the seeds and to the beneficial microbes. The primed seeds are planted under conditions not within one of said threshold germination moisture range and threshold germination moisture range for the unprimed seeds of the same species but within said range for the primed seed, wherein the beneficial microorganism is grown on the seed and matrix during priming matrix material and is planted with the seed and the seeds and soil are innoculated with a beneficial microorganism. The priming process is selected to be suitable for the beneficial microorganism. Thus, after colonizing the seed and matrix, the beneficial microorganism is present in colony numbers on the seed and carried to the soil.

In some cases, harmful agents can be destroyed or rendered ineffective during priming by antibiosis. For example, *Psuedomonas gladioli* which is a fungistatic bacteria has been inoculated onto sweet corn seeds by introduction in moisture during solid matrix priming and killed during dry back and storage. It acted as a powerful fungicide against Pennicilium and Fusarium species, thus SMPI can serve as an effective seed treatment process as well as a vehicle for effective seed and soil beneficial microbe inoculation.

While a preferred embodiment of the invention has been described with some particularity, many modifications and variations in the preferred embodiment may be made without deviating from the invention. Accordingly, within the scope of the appended claims, the invention may be practiced other than as specifically described.

What is claimed is:

1. A method of inoculating seeds during priming which comprises the steps of:
   admixing with continuous aeration of seeds, a particulate solid matrix material and a seed priming amount of water, for a time and at a temperature sufficient to cause the seeds to imbibe sufficient water to enhance resultant plant vigor but insufficient to cause seed sprouting; wherein said mixture has a water potential between about −0.5 to about −2.0 megapascals at equilibrium with said seeds; said particulate solid matrix material being nonpathogenic to the seeds; and
   adding beneficial microorganisms.

2. Seeds primed by the process of claim 1.

3. A seed priming composition adapted to prime seeds which comprises a particulate solid matrix material which is nonpathogenic to seeds and a seed priming amount of water proportioned to permit continuous aeration of seeds, said mixture having a water potential sufficient to cause a desired predetermined seed, when contacted with said composition, to imbibe sufficient water to enhance resultant plant vigor but insufficient to cause seed sprouting.

4. A seed priming composition according to claim 3 in which the composition is favorable to seed priming and microbe inoculation.

5. A planting method comprising the steps of:
   priming seeds by mixing with the seeds a particulate solid matrix material and a seed priming amount of water with sufficient aeration, for a time and at a temperature sufficient to cause the seeds to imbibe sufficient water to enhance resultant plant vigor but insufficient to cause seed sprouting wherein said mixture has a water potential between about −0.5 to about −2.0 megapascals at equilibrium with said seeds and said particulate solid matrix material is nonpathogenic to the seeds; and
   planting the primed seeds under conditions not within one of a threshold germination temperature range and a threshold germination moisture range for the unprimed seeds of the same species but within at least one of a threshold germination temperature range and a threshold germination moisture range for the primed seed.

6. A method according to claim 5 in which the matrix material is removed before planting the seed.

7. A method according to claim 5 in which the matrix material is planted with the seed.

8. A method according to claim 5 in which the seeds are inoculated with a beneficial microorganism and the priming process is suitable for the beneficial microorganism.

9. A method according to claim 1 wherein a volumetric ratio of seed to particulate solid matrix material in the range of one volume of seed to 120 of matrix material and one volume of matrix to ten volumes of seed are admixed.

10. A method according to claim 1 wherein a particulate solid matrix material as a matrix having a bulk density above 0.3 grams per cubic centimeter is mixed with seeds.

11. A seed priming composition according to claim 3 in which the volumetric ratio of seed to particulate solid matrix material is in the range of one volume of seed to 120 of matrix material and one volume of matrix to ten volumes of seeds.

12. A seed priming composition according to claim 3 wherein the particulate solid matrix material is a matrix having a bulk density above 0.3 grams per cubic centimeter.

13. A method of inoculating soil with a beneficial microbe comprising the step of:
   priming seeds by mixing with the seeds a particulate solid matrix material and a beneficial microorganisms culture, a seed priming amount of water, and for a time and at temperture sufficient to cause the seeds to imbibe sufficient water to enchance resultant plant vigor but insufficient to cause seed sprouting wherein said mixture has a water potential between about −0.5 to −2.0 megapascals at equilibrium with said seeds and said particulate solid matrix material is nonpathogenic to the seeds; and
   planting the primed seeds under conditions not within one of and a threshold germination moisture range for the unprimed seeds of the same species but with at least one of a threshold germination temperture range and a threshold germination moisture range for the primed seed, wherein matrix material is planted with the seed and the seeds are inoculated with a beneficial microorganism, the priming process having been suitable for the beneficial microorganism.

14. A method according to claim 1 in which the step of admixing with continuous aeration of seeds, a particulate solid matrix material and a seed priming amount of water includes the step of admixing, with continuous aeration, seeds, particulate solid matrix material and a seed osmoconditioning amount of water and permitting the mixture to stand in a container which allows entry of air.

15. A method according to claim 1 in which the step of admixing with continuous aeration of seeds, a particulate solid matrix material and a seed priming amount of water includes the substeps of wetting a known weight of seed with about 25 percent by weight of water, mixing the wetted seed with dry, flowable particulate solid matrix material, wherein the wet seeds are coated with the particulate matrix material and then adding sufficient water to permit osmoconditioning of the coated seeds.

16. A method according to claim 1 wherein the seeds are seeds selected from a group consisting of the seed of cucumber, lettuce, carrot, onion, melons, sweet corn, tomatoes, eggplant, peppers, bean, radish, squash, pea, flower seeds, alfalfa and soybean.

17. A method according to claim 1 in which the step of admixing with continuous aeration of seeds, a particulate solid matrix material and a seed priming amount of water includes the step of admixing seed fungicides with the seeds, particulate solid matrix material and seed osmoconditioning amount of water.

18. A method according to claim 1 where the beneficial microorganism is a fungi selected from fungi Trichoderma, Gliocladium and Laetisaria.

19. A seed priming composition according to claim 3 in which the particulate solid matrix material includes seed fungicides.

20. A seed priming composition according to claim 3 further including a fungi selected from fungi Trichoderma, Gliocladium and Laetisaria.

21. The process of solid matrix priming of seeds in the presence of added beneficial microorganisms.

22. A method according to claim 1 where the beneficial microorganism is a microorganism selected from a group consisting of the bacteria Pseudomonas, Rhizobia and Serratia.

23. A seed priming composition according to claim 3 further including a microorganism selected from a group consisting of the bacteria, pseudomonas, Rhizobia and Serratia.

24. A method according to claim 1 where the beneficial microorganism is a bacterium of the genus and species *Bacillus subtilis*.

25. A seed priming composition according to claim 3 further including a bacterium of the genus and species *Bacillus subtilis*.

* * * * *